(12) United States Patent
van Staalduinen

(10) Patent No.: US 11,582,919 B2
(45) Date of Patent: Feb. 21, 2023

(54) METHOD AND SYSTEM FOR MOVING A PLANT GROWING CONTAINER

(71) Applicant: LOGIQS B.V., Maasdijk (NL)

(72) Inventor: Gerrit Johannes van Staalduinen, Maasdijk (NL)

(73) Assignee: LOGIQS B.V., Maasdijk (NL)

( * ) Notice: Subject to any disclaimer, the term of this patent is extended or adjusted under 35 U.S.C. 154(b) by 0 days.

(21) Appl. No.: 17/167,033

(22) Filed: Feb. 3, 2021

(65) Prior Publication Data

US 2021/0243963 A1   Aug. 12, 2021

(30) Foreign Application Priority Data

Feb. 7, 2020   (NL) ..................... 2024864

(51) Int. Cl.
*A01G 9/14*   (2006.01)
(52) U.S. Cl.
CPC ................... *A01G 9/143* (2013.01)
(58) Field of Classification Search
CPC ..... A01G 9/143; A01G 31/042; A01G 31/045
USPC .......................................................... 47/17
See application file for complete search history.

(56) References Cited

U.S. PATENT DOCUMENTS

| 3,913,758 | A | * | 10/1975 | Faircloth | ............... | A01G 9/143 |
| | | | | | | 414/373 |
| 4,075,949 | A | * | 2/1978 | Davis | ..................... | B65G 25/10 |
| | | | | | | 198/743 |
| 4,259,907 | A | * | 4/1981 | Schuck | ............... | B65G 1/0485 |
| | | | | | | 198/574 |
| 5,355,621 | A | * | 10/1994 | Yokota | ................... | A01G 9/143 |
| | | | | | | 47/65 |
| 2019/0150375 | A1 | * | 5/2019 | Miyahara | ............... | A01G 9/143 |
| 2019/0308822 | A1 | * | 10/2019 | Struijk | .................. | B25J 9/0093 |
| 2020/0236883 | A1 | * | 7/2020 | Ambrosi | ............... | A01G 31/06 |

FOREIGN PATENT DOCUMENTS

| CN | 109688802 | A | * | 4/2019 | ............ A01G 31/06 |
| KR | 20100036863 | A | * | 4/2010 | |
| NL | 1036753 | | | 9/2010 | |
| NL | 1036753 | C2 | | 9/2010 | |
| WO | WO-03017750 | A1 | * | 3/2003 | ............ A01G 9/143 |
| WO | WO-2013129003 | A1 | * | 9/2013 | ............ A01G 9/143 |
| WO | 2019/030606 | A1 | | 2/2019 | |

OTHER PUBLICATIONS

Machine translation of KR-20100036863-A (Year: 2022).*
EPO Office Action, dated Mar. 9, 2022 (6 pages).

* cited by examiner

*Primary Examiner* — Yvonne R Abbott-Lewis
(74) *Attorney, Agent, or Firm* — Tatonetti IP

(57) ABSTRACT

A method and system for moving a plant growing container, wherein the method makes use of a system that includes a cultivation track, a conveying track, a lift and a guide assembly. The method includes the initially moving the plant growing container at the first level along a first direction from a first end of the cultivation track onto the lift next to the first end of the cultivation track. From there, the plant growing container is lowered from the first level to the second level onto the conveying track. To reduce blocking of the system, the guide is movable to a third level higher than the first level. Furthermore, the method further includes guiding the plant growing container by means of moving said guide to said third level once the container has been moved onto the lift.

14 Claims, 6 Drawing Sheets

METHOD AND SYSTEM FOR MOVING A PLANT GROWING CONTAINER

CROSS-REFERENCE TO RELATED APPLICATIONS

This Non-Provisional Utility Patent Application claims the benefit of and priority to Netherlands Patent Application Serial No. NL 2024864, filed Feb. 7, 2020, entitled "A method and system for moving a plant growing container," the entire contents of which is hereby incorporated herein by reference.

BACKGROUND

A method according to the preamble is known from NL1036753. A problem of the method using said system is that when a plant growing container is incorrectly positioned on the lift support surface that during lowering towards the conveying position said plant growing container may still tilt and/or rotate such that the plant growing container cannot be conveyed by the conveyor track rendering the transport system blocked by the container in a blocking position. The blocking plant growing container needs to be positioned from the blocking position into the conveying position manually before the transport system can be used again. This requires time in which subsequent work cannot be executed, hence causes substantial damage.

SUMMARY

The present invention relates to a method for moving a plant growing container, the method using:
- a cultivation track for supporting and moving the plant growing container at a first level over the cultivation track along a first direction (X), the cultivation track comprising a first end,
- a conveying track for conveying the plant growing container along a second direction (Y) transverse to the first direction (X) and at a second level lower than the first level, wherein the first end of the cultivation track is located next to the conveying track,
- a lift comprising a lift support surface and a lift actuator for driving the lift support surface for moving the plant growing container between the first and the second level, the lift arranged next to the first end of the cultivation track for receiving the plant growing container from the cultivation track on the lift support surface and lowering said plant growing container onto the conveying track,
- a guide assembly comprising a guide for guiding the plant growing container onto the conveying track, wherein the guide is located at the first end of the cultivation track next to the conveying track at a level in between the first level and the second level;

and the method comprising the steps of:
- moving the plant growing container at the first level along the first direction (X) from the first end of the cultivation track onto the lift support surface adjacent to the first end of the cultivation track,
- lowering the plant growing container from the first level to the second level onto the conveying track.

Methods for storing and transporting plant growing containers are ubiquitously used in cultivation spaces of greenhouses or plant growth factories. Methods using said transport systems allow a very high density of plant production in growth spaces because relatively little or no space is required for personnel performing operations on the plants present in the plant growing container on the cultivation track, instead plant growing container are moved from their position on the cultivation track to another location where the operations will be executed. Operations performed can be for example potting, pruning, selection, treating against microbes, harvesting. Such transport systems are widely used and well known in the field of plant cultivation.

Said transport systems used for carrying out the method typically comprise a plurality of cultivation tracks for supporting plant growing container at a first level in the cultivation space. These cultivation tracks are linear having two ends. At a first end of such a cultivation track plant growing container can be unloaded onto a conveying track at a second level, said conveying track arranged next to the cultivation track for conveying plant growing container to another location for operations to be performed or to be loaded onto another cultivation track.

To allow transfer of the plant growing container from the cultivation track to the conveying track a lift comprising a lift support surface and a lift actuator is arranged next to the conveying track. The lift support surface receives the plant growing container from the cultivation track at the first level in a lifting position. Subsequently the plant growing container is moved, supported by the lift support surface actuated by the lift actuator, from the first level to the second lower level in a conveying position underneath the lifting position at the conveying track.

A guide assembly comprising a guide is installed at the end of the cultivation track at a level in between the first and second level. The guide is arranged next to the conveying track in between the first level and the second level such that it is able to guide plant growing container containers towards and onto the conveying track when being lowered. Plant growing container at the first level can pass over the guide assembly onto the lift support surface at the lifting position. In case a plant growing container is inadvertently positioned in another position than the lifting position on the lift, i.e. did not proceed far enough onto the lift to the lifting position, or moved back from the lifting position towards the cultivation track, the guide assembly may, during lowering of the plant growing container, guide the plant growing container in alignment right above the conveying position on the conveying track.

The object of the present invention is to reduce the chance of blocking of a transport systems for plant growth container according the preamble.

To this end, a method according to the preamble is characterized in that the guide being movable to a third level higher than the first level; and the method further comprises a step of: guiding of the plant growing container by means of moving the guide from a level in between the first level and the second level to the third level subsequent to step a).

In this way the method carried out using the aforementioned system comprising the guide movable to a third level higher than the first level improves transport of plant growing container in cultivation spaces in that it reduces the chance of blocking of the transport system by plant growing container lowered from the first level towards the second level into a tilted or blocking position. Containers not properly positioned on the lift are contacted by the guide before and/or during the lowering of the plant growing container from the first level towards the second level and being guided in alignment right above the conveying position before arriving at the second level onto the conveying track for conveying.

According to a favourable embodiment, step c) is carried out overlapping with or simultaneously with step b). In this way the method further reduces the chance of plant growing container being lowered into a blocking position. The opposite movement directions of the guide and the plant growing container generate an improved guiding effect in the event that said guide and said plant growing container contact.

According to a favourable embodiment, step b) and step c) are carried out simultaneously driven by means of the same lift actuator. In this way the lowering of the plant growing container and the raising of the guide is mechanically synchronized and ensures that step b) and c) are carried out simultaneously thereby further reducing the chance of blocking due failure of the guide to be raised when the plant growing container on the lift support surface is lowered. One signal and one actuator suffice for starting both steps and thereby reducing complexity of the control and actuating system resulting in a more robust execution of the method.

According to a favourable embodiment, step c) is carried out with a resilient guide.

In this way the guiding of the plant growing container is further improved. The plant growing container when contacting the guide will engage in an elastic collision preserving the kinetic energy. The guide may be made resilient by constructing it from a resilient material, rubber, resilient polymers, resilient plastics, sheet metal. Alternatively the guide may be made resilient by constructing it with a resilient material, rubber, resilient polymers, resilient plastics, sheet metal, said guide comprising resilient material responding elastically to collisions. Or the guide may be an guide assembly of a rigid surface and springs or resilient material such as rubber, resilient polymers, resilient plastics, said guide assembly being supported by the guide assembly.

According to a favourable embodiment, the moving of the guide in step c) is performed at a relatively high speed and the lowering of the lift support surface in step b) is performed at a relatively low speed. In this way the guiding effect is improved while the plant growing container can be gently lowered. This reduces the chance of plants within the plant growing container to topple over and suffer damage.

Finally, the present invention relates to a transport system for conveying a plant growing container comprising: a cultivation track for supporting and moving the plant growing container at a first level over the cultivation track along a first direction (X), the cultivation track comprising a first end, a conveying track for conveying the plant growing container along a second direction (Y) transverse to the first direction (X) and at a second level lower than the first level, wherein the first end of the cultivation track is located next to the conveying track, a lift comprising a lift support surface and a lift actuator for driving the lift support surface for moving the plant growing container between the first and the second level, the lift arranged next to the first end of the cultivation track for receiving the plant growing container from the cultivation track on the lift support surface and lowering said plant growing container onto the conveying track, a guide assembly comprising a guide for guiding the plant growing container onto the conveying track, wherein the guide is located at the first end of the cultivation track next to the conveying track at a level in between the first level and the second level.

For the sake of brevity, a transport system for conveying plant growing containers comprising these elements is generally known in the field of green house technology. This system suffers inherently from the same drawbacks as the method according claim 1.

To this end, the transport system for conveying a plant growing container according to the preamble is characterized in that the guide being movable to a third level higher than the first level.

In this way the guide assembly comprising the movable guide according the present invention improves the functioning of the transport system in that it reduces the chance of blocking of the transport system by plant growing container lowered by the lift from a non-lifting position at the first level towards the second level into a tilted or blocking position. This is established by moving the guiding means to the third level higher then the first level when the lift is about to lift or is lifting down the plant growing container towards the second level.

The first level is defined by a cultivation plane with a clearance above the cultivation track of at least 5 mm, preferably at least 10 mm and more preferably at least 20 mm. A plant growing container moves with its lowest edges or surface along the first level, but when sagging, deformation or backlash during construction of the plant growing container has occurred parts may extend below this predetermined first level. In this way chance of blocking caused by play, backlash, deformation or sagging of the cultivation track and/or plant growing container can be reduced.

The conveyor track has a proximal edge and a distal edge defined by the width of plant growing container to be conveyed when the container is longitudinally aligned to the second direction wherein the guide, located at the first end of the cultivation track next to the conveying track at a level in between the first level and the second level, is spaced from the conveyor track proximal edge at a distance of at least 5 mm, preferably at least 10 mm, more preferably at least 20 mm. In this way chance of damage to the guide caused by play, backlash or deformation of a plant growing container or the guide can be reduced.

According to a favourable embodiment, the guide comprises a contact surface at a tangent with an angle alpha with the first direction (X) in between 150-85°, preferably 25°-85°, more preferably between 350-85°, and most preferably between 450-85°.

In this way the guide with a sloped or curved contact surface guides a plant growing container more effectively towards the conveying position in case the plant growing container is not in a lifting position before the lift is lowered. The angle alpha is defined as the angle at the vertex of the first direction and the tangent, said angle furthest away from the conveying track and being positive in an upward direction.

According to a favourable embodiment, the guide comprises a wheel with a rotation axis parallel to the second direction (Y).

In this way the guide assembly guides a plant growing container even more effectively towards the conveying position in case the plant growing container is not in a lifting position before the lift is lowered. The wheel is preferably between 30 mm-60 mm, more preferably between 40 mm-50 mm.

According to a favourable embodiment, the guide is being resilient.

In this way the guide assembly guides a plant growing container more effectively towards the conveying position in case the plant growing container is not in a lifting position before the lift is lowered. Preferably the guide comprises a resilient material such as rubber, resilient polymers, resilient plastics, sheet metal, said material arranged such that the guide responds elastically to collisions of a plant growing container with a contact surface of the guide. Alternatively the guide may be an guide assembly of a rigid surface and springs or resilient material such as rubber, resilient polymers, resilient plastics, said guide assembly arranged such that the guide responds elastically to collisions of a plant growing container with the contact surface. Alternatively the guide may be made entirely of resilient material such as, rubber, resilient polymers, resilient plastics, sheet metal.

According to a favourable embodiment, the guide is mechanically coupled to the lift actuator.

in this way the transport system is cheaper to construct and operate. Actuators are expensive and each actuator requires wiring and controls in order to be operated, reducing the amount of actuators by driving the lift support surface of the lift and the guide simultaneously is thus advantageous. This can be achieved by mechanically coupling the guide either indirectly to the actuator via the lift support surface or directly to the actuator. Means of mechanically coupling directly or indirectly are for example chain, cables, mechanical arms or hydraulic system.

According to a favourable embodiment, the third level is at a third level distance from the first level, wherein the third level distance is less than a height of plant growing containers to be transported minus a second level distance between the first and the second level.

in this way plants when present in a plant growing container being conveyed over the conveying track have a reduced chance of being damaged by the guide. The guide in a highest position is below the level of the upper edges of plant growing container present at the conveying track, so when containers pass said guide plant parts extending horizontally beyond an edge of a plant growing container side wall facing the cultivation track cannot be damaged by the guide which is located below the the horizontally extending plant parts.

According to a favourable embodiment, the guide assembly comprises a blocking abutment with a blocking surface facing away from the conveying track in the first direction (X), said blocking abutment at a distance from the guide, the blocking abutment located at the same level as the guide, and simultaneously movable with the guide, wherein the third level is at a third level distance from the first level which third level distance is less than an upper edge distance between the first level and an upper edge of plant growing containers to be transported present at the first level.

In this way blocking of the transport system is further prevented. In case the blocking abutment comprised on the guide assembly is at a level higher than the first level access of a plant growing container present on the cultivation track cannot inadvertently move towards the conveying track when the lift support surface is not in position to receive the plant growing container at the first level. If the lift support surface would not be in position the plant growing container will crash from the first level to the second level in a non-coordinated manner and cause blocking of and damage to the transport system and also results in damage to the goods held in the plant growing container. The blocking abutment and guide being linked or coupled, for example using a horizontal bar, at the same level in the guide assembly also allows a coordinated operation of the guide and blocking abutment so further plant growing container or contents therein extending over the edges cannot interfere with movement of the plant growing container present on the lift support surface or the conveying track.

According to a favourable embodiment, the guide assembly comprises a bias element biasing the guide and the blocking abutment in a position higher than the first level.

In this way the chance of blocking of the conveying track by a plant growing container is further reduced. In case the lift or the guide assembly are malfunctioning the blocking abutment remains at a level higher than the first level blocking the movement of plant growing container present on the cultivation track towards the lift and the conveying track. It thus requires a force to move the blocking abutment to a level lower than the first level and let pass a plant growing container, in absence of such a force, for example by an actuator being defect, the transport system is secured. Bias elements that may be used are for example a tension spring, a compression spring, a tension belt, a tension blade, a compression blade, a hydraulic cylinder or any other device that can generate tension.

According to a favourable embodiment, the guide assembly is a plurality of guide assemblies spaced apart over the width of the cultivation track.

In this way the guide are arranged to cooperate in order to prevent rotation of a plant growing container during lowering reducing the chance of blocking considerably compared to the use of only one guide.

BRIEF DESCRIPTION OF THE DRAWINGS

The present invention will now be illustrated with reference to the drawing where.

DETAILED DESCRIPTION

Figure 1A:
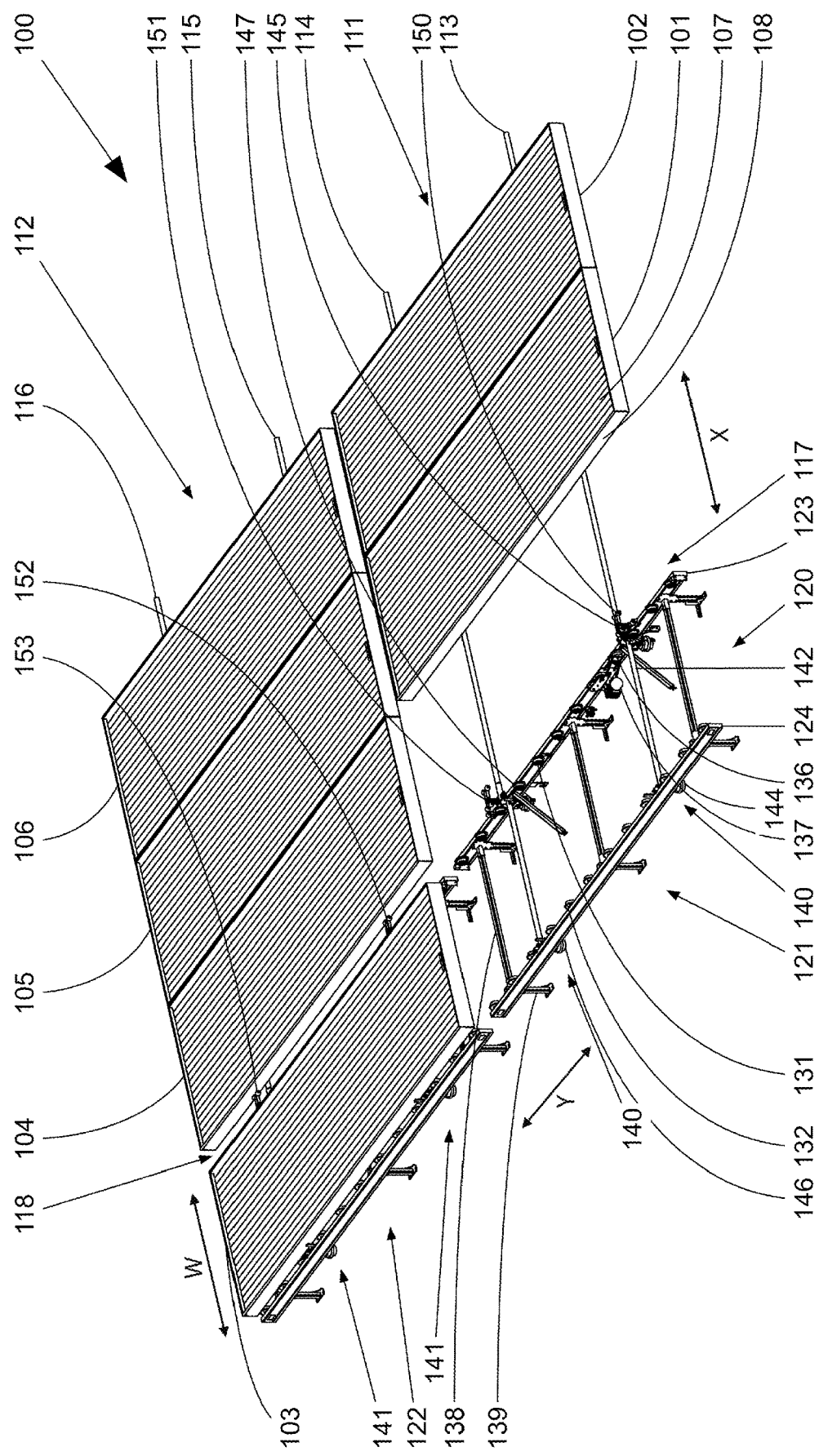
FIG. 1a shows an isometric view of an embodiment of a transport system for conveying plant growing container.
Figure 1B:
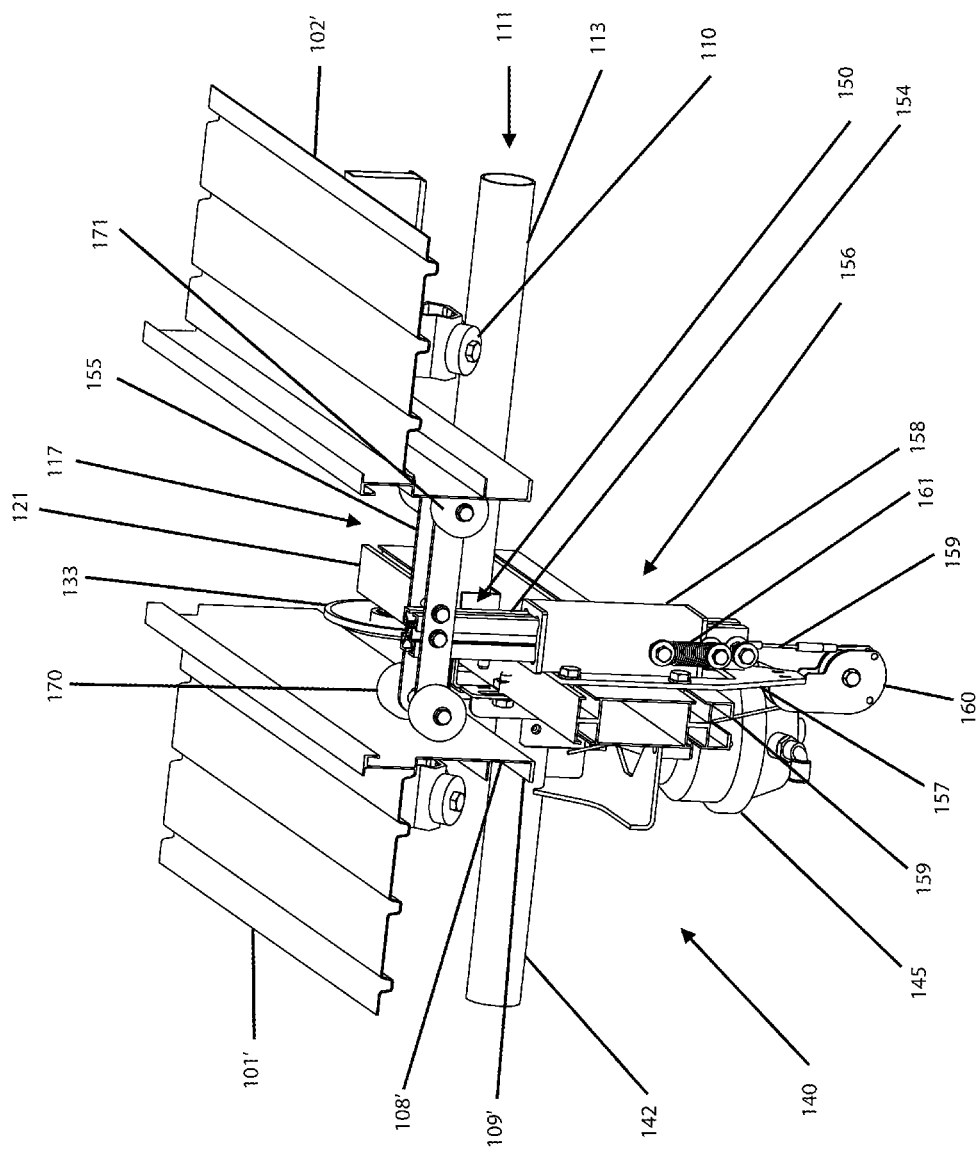
FIG. 1b shows an isometric view of an embodiment of a transport system for conveying plant growing container.

FIG. 1 shows isometric view of an embodiment of a transport system 100 for conveying plant growing container 101, plant growing container 102, plant growing container 103, plant growing container 104, plant growing container 105 and plant growing container 106 comprising a first cultivation track 111 and a second cultivation track 112. The plant growing container 101, 102, 103, 104, 105, 106 comprise a bottom wall 107 with profiles along the longitudinal direction for providing rigidity to the bottom wall 107. Side walls 108 extend upward from the bottom to form a lumen in which goods may be placed. The side walls 108 also extend downward of the bottom wall 107 end, the lower edge of the longitudinal wall moving at a first level relative to the cultivation track 111. The cultivation tracks 111, 112 are respectively formed formed by 2 sets of 2 rails each, the cultivation track 111 formed by cylindrical tube 113 and cylindrical tube 114 the cultivation track 112 formed by cylindrical tube 115 and cylindrical tube 116. The cylindrical tubes 113, 114 support the plant growing container 101 and 102 which comprise container wheels (not shown) mounted underneath the plant growing container 101, 102 so the plant growing containers 101, 102 may be moved bidirectionally over the cylindrical tubes 111, 112 along a first direction X. The container wheels are arranged such, see FIG. 1b, that they prevent said wheels from sliding of the cylindrical tubes 113, 114 supporting them and keeps the plant growing container 101, 102 properly aligned to the cultivation track 111. At extremities of cylindrical tubes 113, 114 a first end 117 defines the terminus of the cultivation track 111. Likewise, at extremities of cylindrical tubes 115, 116 a further first end 118 defines the terminus of the cultivation track 112.

The first end 117 and further first end 118 are located next to a conveying track 120 for conveying plant growing container bidirectionally along a second direction Y transverse to the first direction X. The conveying track 120 is made up of a plurality of identical conveying modules 121, 122. The conveying module 121 comprises 2 longitudinal profiles 123, 124 arranged in parallel. Longitudinal profiles 123, 124 have sides facing each other, said sides respectively provided with a first plurality of flanged wheels 130 and a second plurality of flanged wheels 131 for supporting and conveying the plant growing container on the treads of the flanged wheels in between the flanges. The highest portion of the surface of the treads of the first plurality flanged wheels 130 and the second plurality of flanged wheels 131 define a second level lower relative to the first level. Longitudinal profile 123 is arranged next to the first end 117, longitudinal profile 124 is arranged at a distance from the the first end 117, said distance larger than the width of plant growing container 101, 102, 103, 104, 105, 106 so they can be accommodated in between the flanges of the pluralities of flanged wheels 130, 131. One flanged wheel arranged at longitudinal profile 123 is an driving flanged wheel 136 actuated by a motor 137 in order to drive a plant growing container supported by said driving flanged wheel 136. Bars 138 and posts 139 provide for structural rigidity and support of the conveying module 121.

At end of the first end 117 and the further first end 118 of the cultivation tracks 111, 112 lift 140 and lift 141 are arranged. The lift 140 comprises tube 142 and tube 143 for supporting plant growth containers and actuatable by lift actuator 144, lift actuator 145, lift actuator 146 and lift actuator 147. When the tubes 142, 143 are in a lowered position they are positioned below the second level, and as such do not support plant growing containers if present and supported by the plurality of flanged wheels 130, 131 of conveying module 121. The tubes 142, 143 may be raised by lift actuators 144, 145, 146, 147 in a raised position to align to the extremities of tubes 113, 114 at the first end 117 of cultivation track 111 allowing plant growing container 101 to be moved onto the tubes 142, 143 of lift 140. Lowering by the lift actuators 144, 145, 146, 147 of the tubes 142, 143 supporting a plant growing container from the raised position to lowered position, results in said plant growing container being positioned with its lower edges of the longitudinal edges on the treads of the pluralities of flanged wheels 130, 131.

Guide assembly 150 and guide assembly 151, and guide assembly 152 and guide assembly 153 are respectively positioned at the first end 117 and the further first end 118 of cultivation tracks 111, 112. Referring to FIG. 1b for functioning and details on guide assemblies 150, 151, 152, 153, said guide assemblies comprise a vertical bar 154 movable along its vertical axis allowing a lowered guide position and a raised guide position, guide assemblies 150, 151, 152, 153 are shown in a raised guide position. On top of said vertical bar 154 a horizontal bar 155 is mounted aligned with its longitudinal axis parallel to the first direction X. The end of the horizontal bar 155 nearest to the conveying track 120 comprises a first pair of wheels 170 made of rubber that can rotate around its axle, said axle is aligned with its rotation axis parallel to the second direction Y. The tread surface of the first pair of wheels 170 are contact surfaces serving as guides for delivering a force against side walls of plant growing container. The end of the horizontal bar 155 furthest removed from the conveying track 120 comprises a second pair of wheels 171 made of rubber that can spin around its axle, said axle aligned with its rotation axis parallel to the second direction Y. The tread surface of the second pair of wheels 171 are contact surfaces serving as abutments for delivering a counter force against side walls of plant growing container moving towards the further first end 118 on cultivation track 112. This allows stopping of the plant growing container 104 from moving onto the lift support surface formed by tube 142 and tube 143 when not in a raised position, or allows when lift 141 or conveying module 122 is occupied by a plant growing container, as in this case, from keeping the plant growing container 104 at the further first end of cultivation track 112 at a distance. In this way plants inside a further container having leaves extending over the side walls can be prevented to interact with plants in the plant growing container present on conveying module 122 which can thus move without interference and plants toppling over due interaction between plants extending over side walls. The raised guide position is such that the second pair of wheels is at a level lower than upper edges of side walls of plant growing container supported by the cultivation track at the first level, the raised guide position is also such that the first pair of wheels is at a level lower than upper edges of side walls of plant growing container supported by the conveying track at the second level.

Referring again to FIG. 1b, guide assemblies 150, 151 and 152, 153 are mechanically coupled to lifting devices 140, 141 respectively. Lifting devices 140, 141 in a lowered lift support surface position are mechanically coupled in such way that the guide assemblies 150, 151, 152, 153 are maintained in a raised guide position. In case lifting devices 140, 141 assume a raised lift support surface position the guide assemblies 150, 151, 152, 153 will be actuated to a lowered guide position. Lifting devices 140, 141 in a raised lift support surface position maintains guide assemblies 150, 151 and/or 152, 153 in a lowered guide position respectively. Guide assemblies in a lowered guide position have their corresponding first pair of wheels, their corresponding second pair of wheels, and their corresponding horizontal bar positioned entirely under the first level. In this way a lowered guide position allows movement of a plant growth from the cultivation track onto a lift or from a lift onto a cultivation track.

The method using the transport system according this embodiment for moving a plant growing container from a cultivation track to a conveying track comprises the steps of:
   raising the lift support surface in a raised lift support surface position, simultaneously lowering a guide and an abutment to a level under a first level;

moving the plant growing container at a first level in a first direction from the cultivation track onto the lift support surface;

lowering the plant growing container from the first level to a second level onto the conveying track and simultaneously raising the guide and the abutment to a level higher than the first level.

The method may further comprise:

moving the plant growing container at a second level in a second direction transverse to the first direction.

FIG. 1b shows an isometric view from a cross section of the second cultivation track of the embodiment according FIG. 1 through a vertical plane parallel to the first direction X in which the guide assembly 150 is in a raised guide position and is flanked by a plant growing container 101' in a conveying position at the conveying module 121 and by a plant growing container 102' present near the further first end 117 of the cultivation track 111.

Plant growing container 101' comprises a flange 109' at the lower edge of side wall 108' and a flanged wheel 130 supports plant growth container 101' by means of the flange 109' resting on the highest portion of the surface of the tread of flanged wheel 130 defining the second level. Plant growing container 102' is supported via container wheels 110 on cylindrical tube 113 of the cultivation track 111.

Lift 140 comprises a lift actuator 145 supporting tube 142 located below the second level, and in this position does not support container 101'.

Guide assembly 150 is located at the further first end 117 of cultivation track 111. Guide assembly 150 comprises a guide assembly frame 156 comprising a plate 157 bolted to the conveyor module 121, and further comprising a shaft 158 comprising a passage holding the vertical bar 154. A steel cable 159 mechanically couples the tube 148 of the lift 140 via a single pulley 160 fixed to the guide assembly frame 156 at a level below both the tube 148 and the vertical bar 154 when either of them is in its lowest possible position. A tension spring 161 is arranged in between the guide assembly frame 156 and a lower end of the vertical bar 154 to bias the vertical bar 154 in the raised guide position. On top of said vertical bar 154 a horizontal bar 155 is mounted wherein a first pair of wheels form a guide 170 and a second pair of wheels form an abutment 171. Container 102' abuts against abutment 171, container 102' is spaced at a distance from guide 170.

Figure 2:
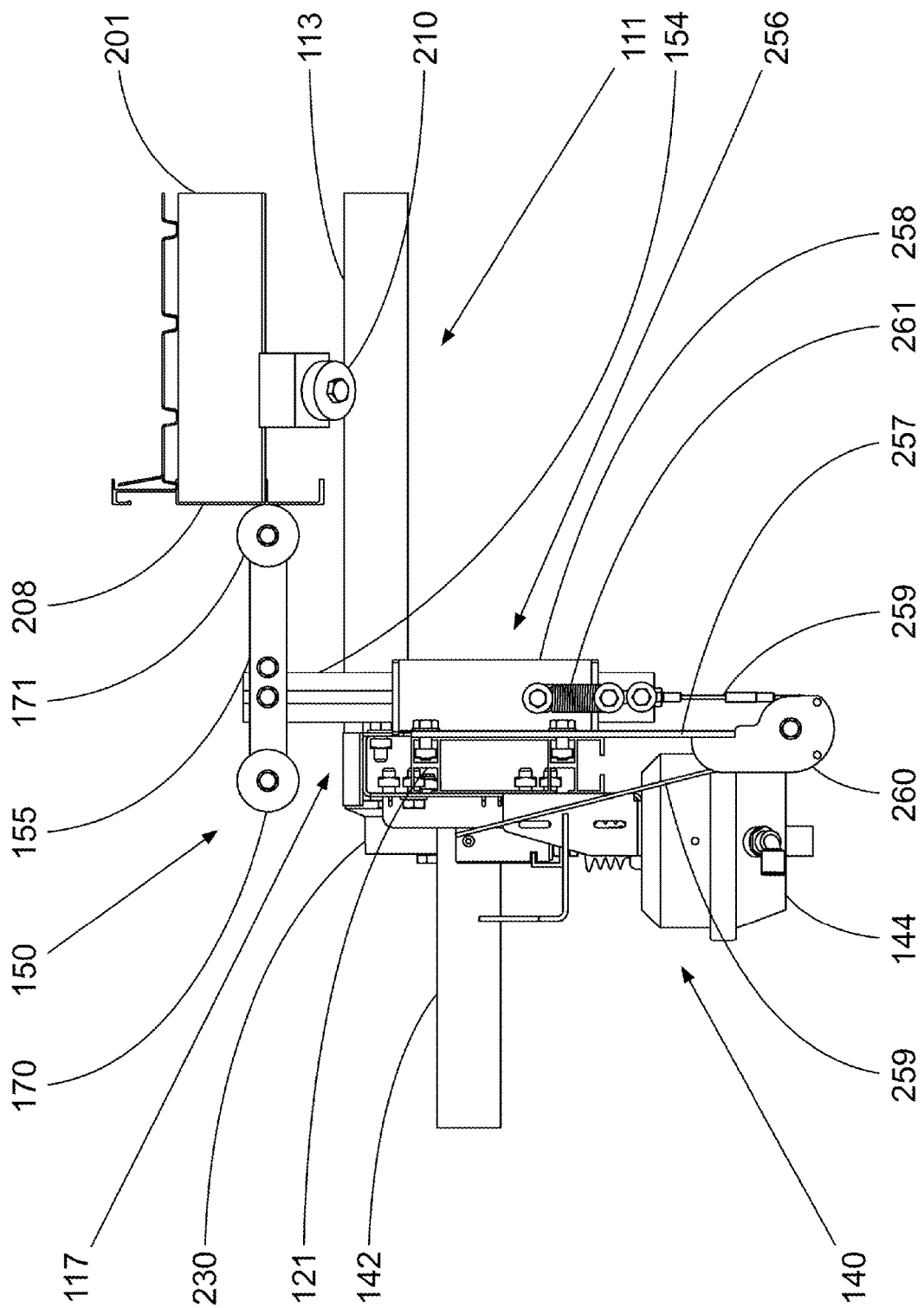
FIG. 2 cross section through the embodiment according FIG. 1 through a vertical plane parallel to the first direction X in which the guide assembly is in a raised guide position.

FIG. 2 shows a cross section through the embodiment according FIG. 1 through a vertical plane parallel to the first direction X in which the guide assembly is in a raised guide position. In this instance the first cultivation track 111 supports a first plant growing container 201 by means of a pair of container wheels 210 mounted at the underside of said first plant growing container 201 comprising a side wall 208. The tread of container wheels rest on the cylindrical tube 113. The pair of wheels are mounted at an angle from the vertical such that the pair of wheels are supported by the upper inclined surfaces of cylindrical tube 113. The guide assembly 150 and the lift 140 are arranged at the first end 117 of the cultivation track 111. The lift actuator 144 is of an hydraulic actuator type and supports the tube 142 in a lowered position below the second level determined by the tread of the flanged wheel 230. The guide assembly 150 comprises a guide assembly frame 256 comprising a plate 257 bolted to the conveyor module 121, and further comprising a shaft 258 comprising a passage holding the vertical bar 154. A steel cable 259 mechanically couples the tube 142 of the lift 140 via a single pulley 260 fixed to the guide assembly frame 256 at a level below both the tube 142 and the vertical bar 154 when either of them is in its lowest possible position. A tension spring 261 is arranged in between the guide assembly frame 256 and a lower end of the vertical bar 154 to bias the vertical bar 154 in the raised guide position wherein the guide 170 and abutment 171 are at a level higher than the first level coupled to the vertical bar 154 via horizontal bar 155.

Figure 3:
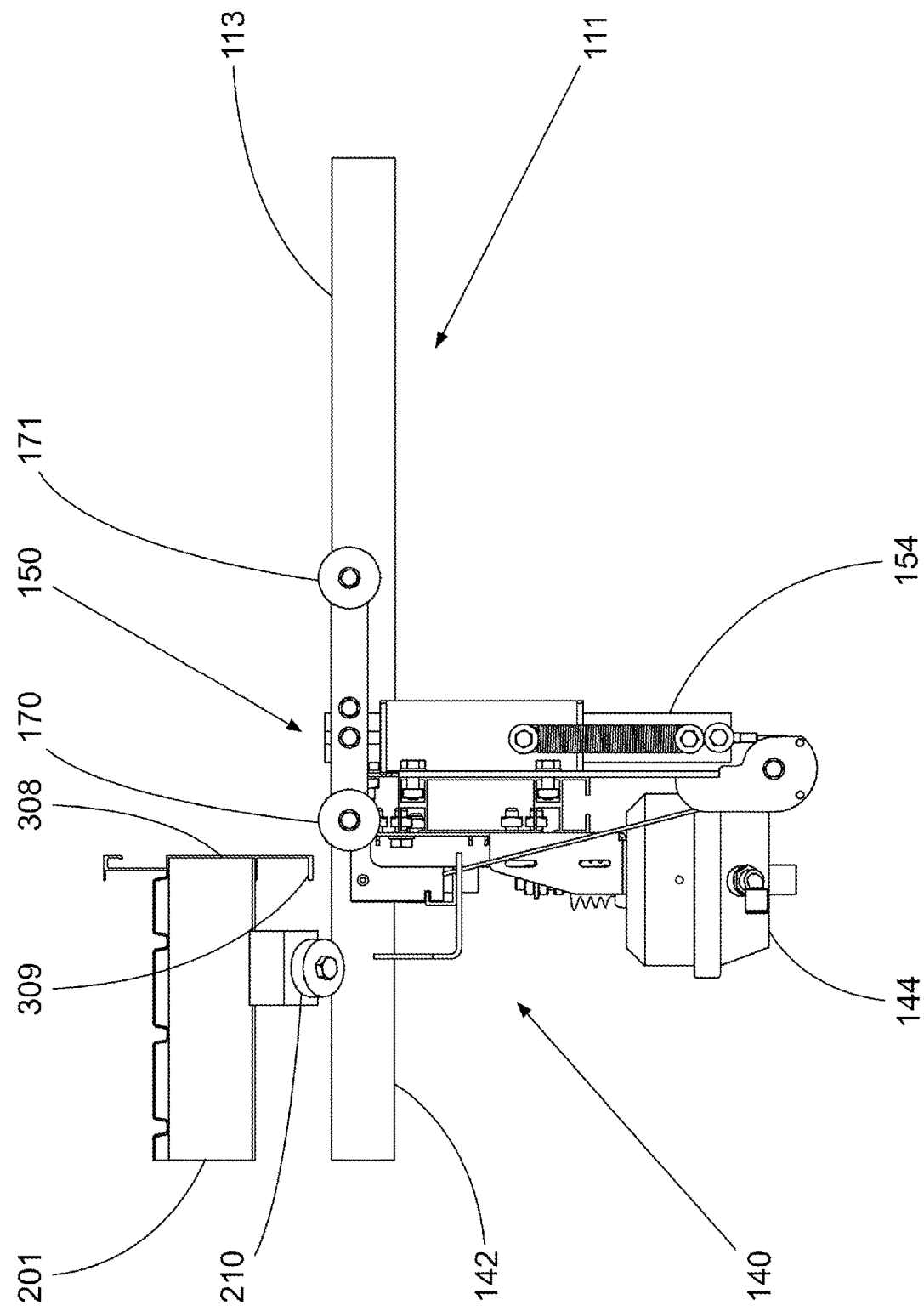
FIG. 3 shows a cross section through the embodiment according FIG. 1 through a vertical plane parallel to the first direction X in which the guide assembly is in a lowered guide position and the plant growing container has been moved over the guide assembly onto the lift support surface of the lift.

FIG. 3. shows a cross section through the embodiment according FIG. 1 through a vertical plane parallel to the first direction X. In this instance the guide assembly is in a lowered guide position and the plant growing container 201 has been moved from the cultivation track 111 over the guide assembly 150 onto tube 142 of the lift 140. For moving the first plant growing container 201 from the first cultivation track 111 to the lift 140 the tube 142 was raised and maintained in the raised position by the lift actuator 144. The container 201 was subsequently moved rolling on its containers wheels 210 from cylindrical tube 113 to the tube 142 adjacently positioned by the lift 140. Due the mechanical coupling between the tube 142 of the lift 140 and the vertical bar 154 of the guide assembly 150 the guide 170 and abutment 171 were lowered and maintained in a lowered guide position at a level lower than the first level. This configuration allows passage at the first level of the first plant growing container 201 over the guide assembly 150 onto the tube 142 of the lift 140. The lower edge of the sidewall 308 of the plant growing container 201, comprising flange 309, pass at the height of the first level.

Figure 4:
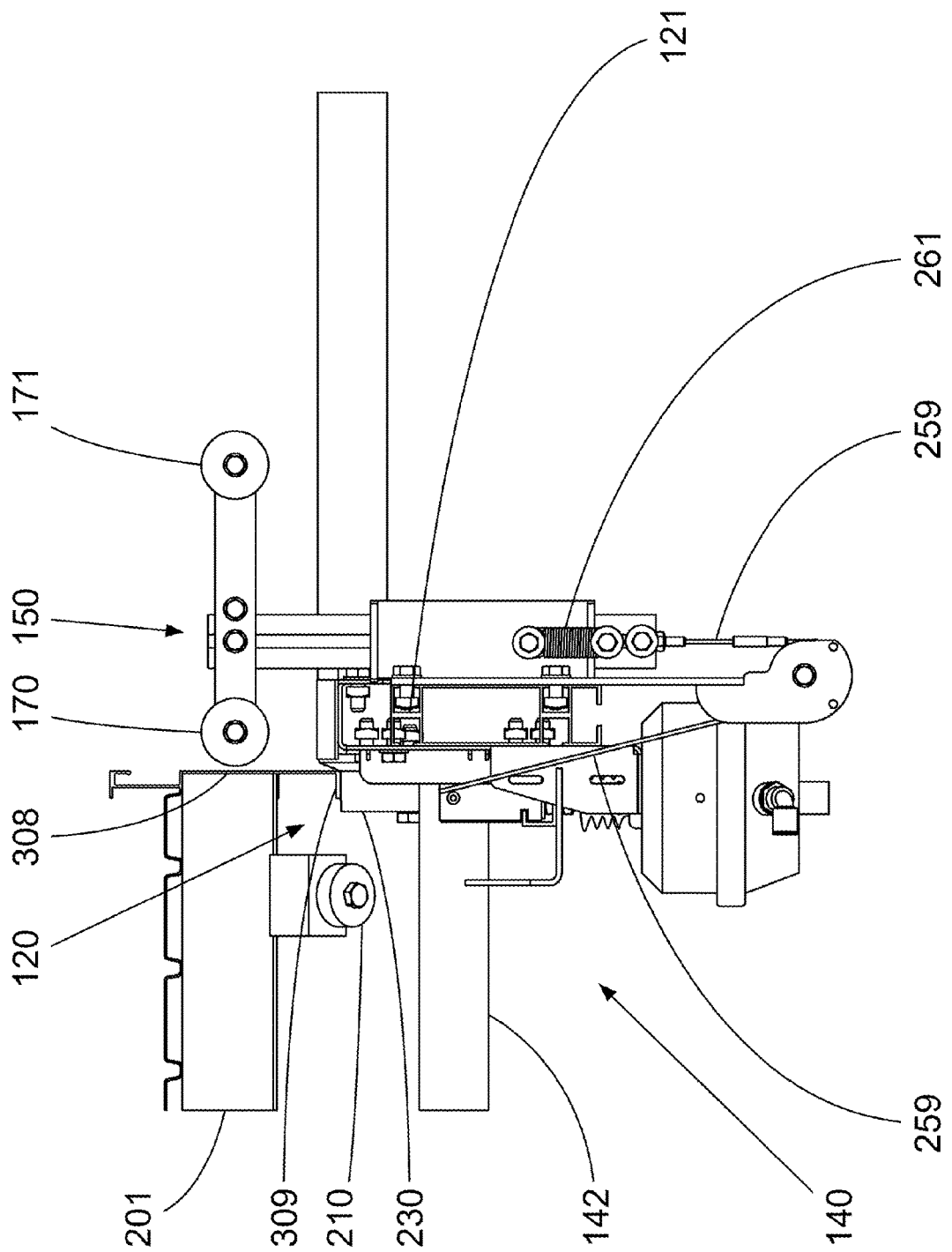
FIG. 4 shows a cross section through the embodiment according FIG. 1 through a vertical plane parallel to the first direction X in which the guide assembly is in a raised guide position and the plant growing container is lowered onto the conveying track.

FIG. 4. shows a cross section through the embodiment according FIG. 1 through a vertical plane parallel to the first direction X. In this instance the guide assembly 150 is in a raised guide position and the plant growing container 201 was lowered onto flanged wheel 230 of the conveying track 120. The lift 140 lowered tube 142 to a level below the second level to a non-lifting position, simultaneously the guide 170 and abutment 171 raised into a raised guide position by the biasing force of tension spring 261 and lack of force via steel cable 259 of the mechanical coupling due lowering of the tube 142. The bias of guide 170 to a level higher than the first level generates an impulse allowing improved correction of plant growing container to an appropriate conveying position at the conveying track 120. The plant growing container 201 is properly placed in a conveying position because the flange 309 at the lower edge of side wall 308 is supported by the tread of flanged wheel 230 and treads of other flanged wheels of the conveying module 121. Because the plant growth container 201 is now supported by the flanged wheels of conveyor track and the the tube 142 was lowered below the second level the container wheels 210 unsupported and the container 201 is not restrained for movement along the second direction Y over the conveying track.

Figure 5:
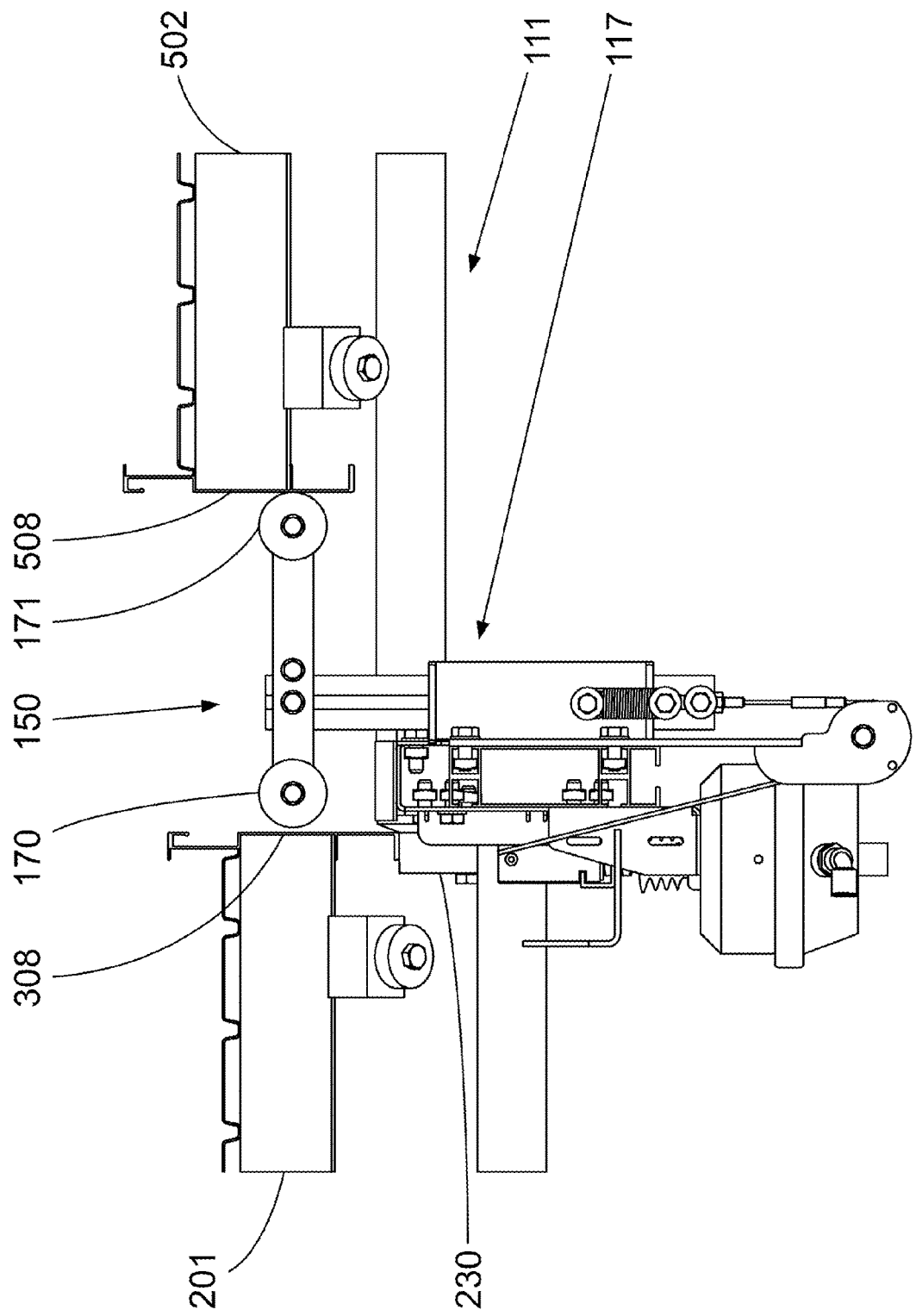
FIG. 5 shows a cross section through the embodiment according FIG. 1 through a vertical plane parallel to the first direction X in which the guide assembly is in a raised guide position and a further plant growing container is spaced apart from the first plant growing container by the guide assembly.

FIG. 5 shows a cross section through the embodiment according FIG. 1 through a vertical plane parallel to the first direction X in which the guide assembly 150 is in a raised guide position and a further plant growing container 502 is moved into a position near the first end 117 of cultivation track 111 abutting with its side wall 508 against abutment 171 spaced apart from the first plant growing container 201 by the guide assembly 150. Plant growth container 201 is due a sloped flange of flanged wheel 230 guided in the conveying position spaced from guide 170. In this way the movement of plant growth container along direction Y on the conveying track is not interfered with by the guide 170. Additionally, when plant parts extend outward over the side wall 308 of the first plant growing container 201 and side wall 508 of the further plant growing container 502 said plant parts can be prevented to interact with each other. Because the guide 170 and abutment 171 are located below the level of the upper edges of side wall 308 of plant growth containers 201 said plant parts extending horizontally can also be prevented to interact with the guiding assembly 150 avoiding interference with the conveying of the first plant growing container 201 along direction Y, this reduces the chance that plants topple over within the plant growing container or even out of plant growing container causing damage to plants and/or potentially blocking transport of plant growing container within the transport system.

The invention claimed is:

1. A method for moving a plant growing container, the method using:
   a cultivation track for supporting and moving the plant growing container at a first level over the cultivation track along a first direction (X), the cultivation track comprising a first end,
   a conveying track for conveying the plant growing container along a second direction (Y) transverse to the first direction (X) and at a second level lower than the first level, wherein the first end of the cultivation track is located next to the conveying track,
   a lift comprising a lift support surface and a lift actuator for driving the lift support surface for moving the plant growing container between the first and the second level, the lift arranged next to the first end of the cultivation track for receiving the plant growing container from the cultivation track on the lift support surface and lowering said plant growing container onto the conveying track,
   a guide assembly comprising a guide surface for guiding the plant growing container onto the conveying track, wherein in a first position the guide surface extends between the first end of the cultivation track at the first level to the conveying track at the second level,
   and the method comprising the steps of:
   a) moving the plant growing container at the first level along the first direction (X) from the first end of the cultivation track onto the lift support surface adjacent to the first end of the cultivation track,
   b) lowering the plant growing container from the first level to the second level onto the conveying track;
   wherein the guide surface being movable to a second position at a third level higher than the first level; and the method further comprises a step of:
   c) guiding of the plant growing container by means of moving the guide surface from the first position to the second position subsequent to step a).

2. The method of claim 1, wherein step c) is carried out overlapping with or simultaneously with step b).

3. The method of claim 2, wherein the moving of the guide surface in step c) is performed at a relatively high speed and the lowering of the lift support surface in step b) is performed at a relatively low speed.

4. The method of claim 1, wherein step b) and step c) are carried out simultaneously driven by means of the same lift actuator.

5. The method of claim 1, wherein step c) is carried out with a resilient guide surface.

6. A transport system for conveying a plant growing container comprising:
   a cultivation track for supporting and moving the plant growing container at a first level over the cultivation track along a first direction (X), the cultivation track comprising a first end,
   a conveying track for conveying the plant growing container along a second direction (Y) transverse to the first direction (X) and at a second level lower than the first level, wherein the first end of the cultivation track is located next to the conveying track,
   a lift comprising a lift support surface and a lift actuator for driving the lift support surface for moving the plant growing container between the first and the second level, the lift arranged next to the first end of the cultivation track for receiving the plant growing container from the cultivation track on the lift support surface and lowering said plant growing container onto the conveying track,
   a guide assembly comprising a guide surface for guiding the plant growing container onto the conveying track, wherein the guide surface in a first position extends from the first end of the cultivation track at the first level to the conveying track at the second level;
   wherein the guide surface being movable to a third level higher than the first level.

7. The transport system for conveying a plant growing container of claim 6, wherein the guide surface comprises a contact surface at a tangent with an angle alpha with the first direction (X) in between 15°-85°, preferably 25°-85°, more preferably between 35°-85°, and most preferably between 45°-85°.

8. The transport system for conveying a plant growing container of claim 6, wherein the guide surface is formed on a wheel with a rotation axis parallel to the second direction (Y).

9. The transport system for conveying a plant growing container of claim 6, wherein the guide surface is being resilient.

10. The transport system for conveying a plant growing container of claim 6, wherein the guide surface is mechanically coupled to the lift actuator.

11. The transport system for conveying a plant growing container of claim 6, wherein the third level is at a third level distance from the first level, wherein the third level distance is less than a height of plant growing containers to be transported minus a second level distance between the first and the second level.

12. The transport system for conveying a plant growing container of claim 6, wherein the guide assembly comprises a blocking abutment with a blocking surface facing away from the conveying track in the first direction (X), said blocking abutment at a distance from the guide surface, the blocking abutment located at the same level as the guide surface, and simultaneously movable with the guide surface, wherein the third level is at a third level distance from the first level, in which the third level distance is less than an upper edge distance between the first level and an upper edge of plant growing containers to be transported present at the first level.

13. The transport system for conveying a plant growing container of claim 12, wherein the guide assembly comprises a bias element biasing the guide and the blocking abutment in a position higher than the first level.

14. The transport system for conveying a plant growing container of claim 6, wherein the guide assembly is a plurality of guide assemblies spaced apart over the width of the cultivation track.

* * * * *